(12) United States Patent
Dewitte et al.

(10) Patent No.: US 11,821,122 B2
(45) Date of Patent: Nov. 21, 2023

(54) PROCESS FOR MANUFACTURING A NONWOVEN SHEET MATERIAL HAVING AN IMPERMEABLE LAYER ON ONE SIDE AND AN ANTI-SLIP COATING ON THE OTHER SIDE

(71) Applicant: TWE MEULEBEKE, Meulebeke (BE)

(72) Inventors: Greet Dewitte, Tielt (BE); Dany Michiels, Haaltert (BE); Dominik Roster, Emsdetten (DE)

(73) Assignee: TWE MEULEBEKE, Meulebeke (BE)

( * ) Notice: Subject to any disclaimer, the term of this patent is extended or adjusted under 35 U.S.C. 154(b) by 162 days.

(21) Appl. No.: 16/769,549

(22) PCT Filed: Dec. 6, 2017

(86) PCT No.: PCT/EP2017/081708
§ 371 (c)(1),
(2) Date: Jun. 3, 2020

(87) PCT Pub. No.: WO2019/110098
PCT Pub. Date: Jun. 13, 2019

(65) Prior Publication Data
US 2020/0385904 A1    Dec. 10, 2020

(51) Int. Cl.
*D04H 1/54* (2012.01)
*D04H 1/64* (2012.01)
*B32B 5/02* (2006.01)
*D04H 1/425* (2012.01)

(52) U.S. Cl.
CPC ............. *D04H 1/54* (2013.01); *D04H 1/64* (2013.01); *B32B 5/022* (2013.01); *B32B 2307/744* (2013.01); *D04H 1/425* (2013.01)

(58) Field of Classification Search
CPC ............. D04H 1/54; D04H 1/64; B32B 5/022
See application file for complete search history.

(56) References Cited

U.S. PATENT DOCUMENTS

| | | | | |
|---|---|---|---|---|
| 4,042,655 A | * | 8/1977 | Platt ..................... | D04H 1/54 442/388 |
| 2003/0157288 A1 | * | 8/2003 | Bouchette ............... | B32B 5/26 428/36.1 |
| 2004/0038607 A1 | * | 2/2004 | Williamson ............. | D04H 1/64 442/101 |
| 2006/0286334 A1 | | 12/2006 | Harpole | |
| 2019/0299248 A1 | * | 10/2019 | Mandzsu ................ | B32B 5/024 |

FOREIGN PATENT DOCUMENTS

WO         01/34053 A1    5/2001

OTHER PUBLICATIONS

Albrecht, et al., Nonwoven Fabric: Raw Materials, Manufacture, Applications, Characteristics, Testing Processes, Mar. 2003.

* cited by examiner

*Primary Examiner* — Jeremy R Pierce
(74) *Attorney, Agent, or Firm* — Maschoff Brennan

(57) ABSTRACT

Processes are disclosed for manufacturing a nonwoven sheet material having an impermeable layer on one side and an anti-slip coating on the other side. The process includes carding fibers with a common general orientation and forming a web and bonding the fibers into a nonwoven sheet material. An anti-slip coating is applied onto one surface of the material. A polymer is applied onto the other surface of the nonwoven material. The orientation of the fibers is maintained during the entire process.

12 Claims, 3 Drawing Sheets

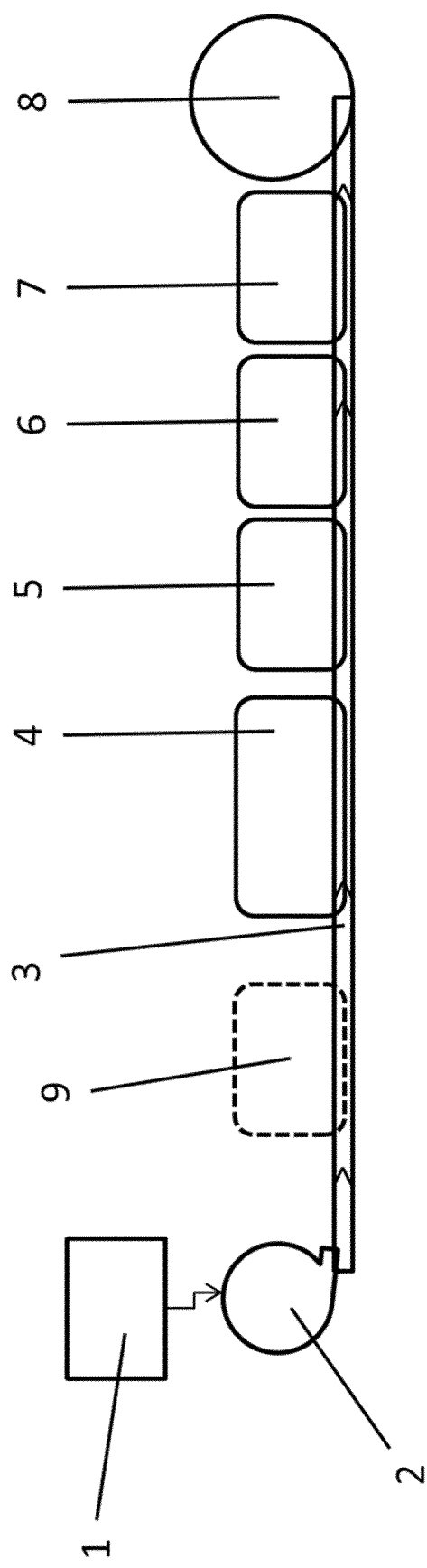

PROCESS FOR MANUFACTURING A NONWOVEN SHEET MATERIAL HAVING AN IMPERMEABLE LAYER ON ONE SIDE AND AN ANTI-SLIP COATING ON THE OTHER SIDE

CROSS-REFERENCE TO RELATED APPLICATIONS

This application is a nationalization of PCT Application No. PCT/EP2017/081708 filed Dec. 6, 2017.

BACKGROUND OF THE INVENTION

Field of the Invention

The invention relates to the field of temporary protection used to protect surfaces during activities susceptible of splashing liquid or deteriorate these surfaces.

Description of Related Art

Disposable or single use protections to temporarily protect surfaces, like floors, pieces of furniture, stairs or glass windows, during for instance renovation works or children activities, have been on the market for over twenty years. In particular, impermeable and anti-slip fleeces or sheet materials are very popular. They are made of three layers, namely a central layer of nonwoven material, a top layer of an impermeable barrier or liquid impervious or waterproof film and a bottom layer of an anti-slip coating.

Such an impermeable, anti-slip sheet material needs to be resistant to tear, and support individuals walking on it as well as working equipment being installed on it, such as for example ladders. To some extent, the material should also be resistant enough to be re-used several times. Impermeability also needs to be ensured over the lifetime of the product. The quality of the anti-slip coating is of utmost importance for the safety of its users. Impermeability should however not prevent the material to be breathable.

Up to now, such a three layer material is manufactured according to the following process.

In a first step, the nonwoven layer is manufactured. A web of more or less parallelly oriented fibers is prepared in a carding machine from staple fibers. The web then goes into a crosslapper, continuously folding and piling layers of web on top of each other while the bottom pile is slowly shifted in a perpendicular direction (FIG. 1). The crosslapping ensures on one hand, the continuity of the material, and, on another hand, a simultaneous longitudinal and lateral resistance of the nonwoven. Indeed, after this operation, the fibers are disposed according to random orientations. The resulting web is then bonded, by a mechanical, chemical and/or thermal operation, resulting in a nonwoven material usually having a weight over around 120 g/m².

In a second step, an anti-slip coating is applied on one surface of the nonwoven material. Usually an acrylic binder is sprayed onto the nonwoven, with or without tackifiers.

In the last step, a polymer impermeable layer is laminated, from a film or foil, onto the second surface of the nonwoven material.

This production method is called a L-process, as the crosslapper induces a 90° angle deviation in the arrangement of the equipment of the production line.

While this process enables the manufacture of a very resistant impermeable, anti-slip sheet material, it is very limited in its production output. The crosslapping step is limited to an output speed of about 25 m/min. A similar limitation applies to the lamination step, which is usually performed by means of hotmelt and an infrared heater.

In view of the high demand for such impermeable, anti-slip products, the applicant has judged necessary to look for a new production process which could improve the production rate or speed, and consequently reduce the production cost.

BRIEF SUMMARY OF THE INVENTION

Solution of the Invention

To this effect, the applicant proposes a process for manufacturing a nonwoven sheet material having an impermeable layer on one side and an anti-slip coating on the other side, process comprising the steps of:
  carding fibers and forming a web, wherein the fibers have a common general orientation;
  bonding the fibers into a nonwoven sheet material and applying an anti-slip coating onto one surface of the nonwoven sheet material, characterized in that it further comprises the step of
  applying a polymer onto the second surface of the nonwoven sheet material and
  maintaining the orientation of the fibers over the whole process.

The process of the instant invention case can thus be named parallel or inline process, or even a unidirectional process, meaning that there is no crosslapping applied to the fibers web before bonding. No angle is therefore introduced in the series of equipment involved in the process, equipment for carding, bonding, applying the antislip and the impermeable polymer being aligned.

The inline manufacture of nonwoven sheet material has been known for several years. While it enables to run a manufacturing process at over 200 m/min, it leads to the production of much lighter nonwoven material sheets than the ones usually used in impermeable anti-slip protection, i.e. having a minimal weight of, but not limited to, around 100 g/m² or around 120 g/m² and up to, but not limited to, 180 g/m² or even higher, when using up to three parallel carding machines to overlap three layers before bonding. Moreover, the fibers in such nonwoven material sheets are essentially parallel, resulting in a significant loss of lateral strength of the material.

Historically, as the manufacturing process of the impermeable, anti-slip material was anyway limited in speed by the lamination of the impermeable barrier, it had never been considered to replace the L-process to manufacture the nonwoven material by an inline process, as only disadvantages, like a loss of lateral strength, would have resulted from the replacement.

Only recently, techniques for industrially applying a polymer onto a large surface at a speed up to 200 m/min became available. For example, the impermeable polymer can be applied by high speed lamination, using for example electromagnetic heating, ultrasonication, hotmelt adhesives or wide web spray lamination.

The impermeable polymer can also be applied by spraying an extruded/melted polymer on the nonwoven material. Other techniques enabling application of a polymer at high speed may also be or become available and should also be encompassed in the scope of the claimed invention.

High speed should be understood as a speed of the line higher than the current speed of 25 m/min currently used, for example higher than 50 m/min, and preferably higher than 100 m/min.

When replacing, in combination, both the L-process to manufacture the nonwoven material by an inline process and the standard lamination of the impermeable layer by high speed techniques as described above, it was found that the resulting impermeable barrier confers sufficient resistance to the final product to compensate for the loss of lateral strength of the nonwoven layer.

By daring to replace two steps in a process, meaning two pieces of equipment in the production line, the applicant has overcome the prejudice that the final product would lose in quality. The new proposed process hereby enables to increase by up to around 10 times the speed of production of impermeable anti-slip nonwoven sheet material, to decrease the density/weight of the central nonwoven layer below about 120 g/m² while maintaining very good resistance of the final product in all directions. This is why the process of the instant case involves the required inventive step.

Additionally, up to now, the anti-slip layer was an acrylic binder applied by a spray-dry technique, which also contributed to a limitation in speed of the process. The applicant has also looked into replacing this step by techniques enabling a faster output and found that other materials, like for example, but not limited to, polyurethane coating, could be applied at speed up to 200 m/min.

An advantage of using an inline process is that several carding machines, usually up to three, can operate in parallel, the parallel webs being overlapped just before bonding. Though the webs can be made with similar fibers, it is interesting to be able to use a different blend of fibers for each web, each blend conferring to the resulting bonded nonwoven material specific properties. One blend of fibers could, for example, have flame retardant properties; another blend could confer hydrophobic properties.

For the sake of security for the applicant, the product obtained by the process is also claimed, said product being a nonwoven sheet material having an impermeable layer on one side and an anti-slip coating on the other side, characterized in that the fibers of the nonwoven sheet material have a common general orientation.

The common general direction referred to is the machine direction (MD) as known to the person skilled in the art.

The product is entirely linked to the claimed process by the unique inventive concept of maintaining the fibers along a common general orientation.

BRIEF DESCRIPTION OF THE SEVERAL VIEWS OF THE DRAWINGS

The invention will be better understood with the following description of several examples, referring to the accompanying drawing on which:

FIG. 2 is a bloc diagram illustrating an implementation of the process of the invention;

DETAILED DESCRIPTION OF THE INVENTION

Figure 1:
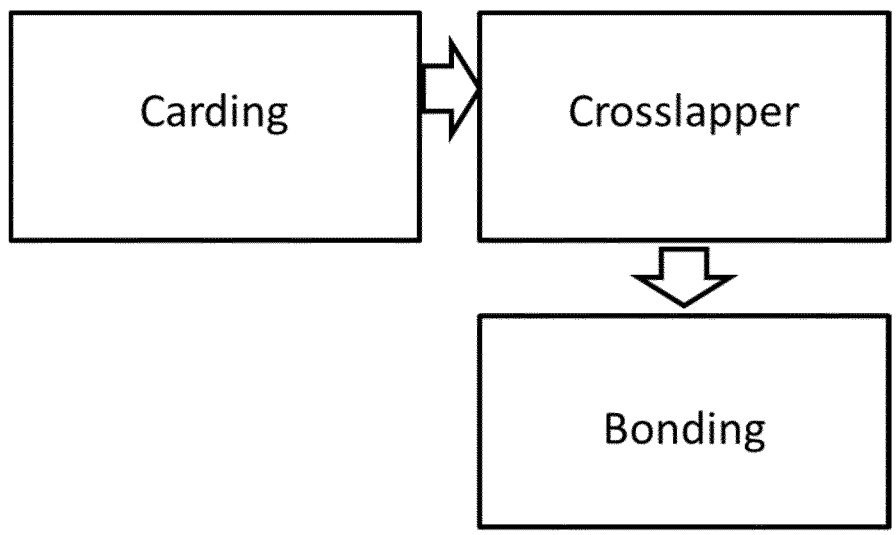
FIG. 1 is a bloc diagram illustrating the L-process according to the prior art.

Referring to FIG. 2, in a first step, raw fibers contained in a bale opener 1 are introduced in a carding machine 2 where they are carded in one direction into a web. The web is then moved along the line by means of a conveyor belt 3. In a second step, the fibers of the web are bonded in an oven 4 before going through a cooling zone 5. In a next step, the nonwoven material resulting from the bonding is sprayed on one of its surface with extruded polymer, i.e., melted polymer in an extruder 6. In a final step, an anti-slip coating is sprayed on its other surface with an antislip coating in a coating machine 7. The resulting product is here further rolled up by a rolling up equipment 8. An optional needling module 9 is here inserted between the carding and the bonding steps.

For clarity of the figure, only one bale opener 1 and one carding machine is illustrated, however, as would be obvious to a person skilled in the art, there can be several bale openers, as well as multiple carding machines implemented, depending on the specifications of the material to manufacture.

Figure 3:
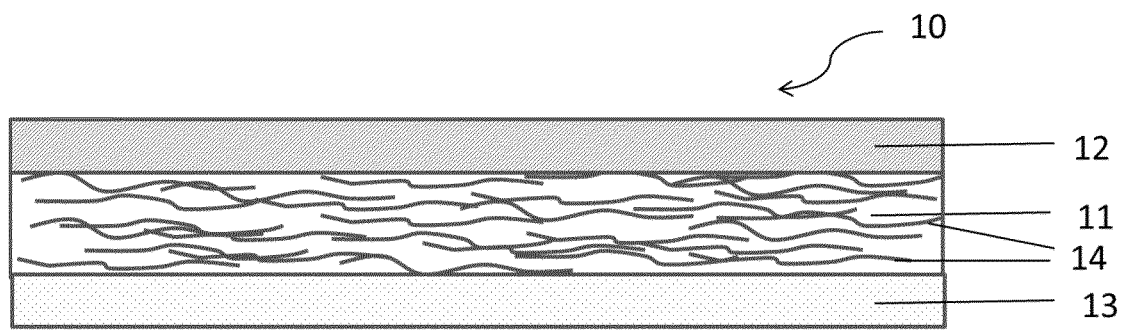
FIG. 3 illustrates a section of a product of the invention.

The implementation of this process leads to the manufacture of article 10, as illustrated in FIG. 3. A nonwoven material layer 11, made from multiple fibers 14, is covered on one side by an impermeable layer 12 and on its other side by an anti-slip coating 13.

Carding is a mechanical process that disentangles, cleans and intermixes fibres to produce a continuous web suitable for subsequent processing. This is achieved by passing the fibers between differentially moving surfaces covered with card clothing. It breaks up locks and unorganized clumps of fibers and then aligns the individual fibers to be parallel with each other. The fibers not being straight elements, they are not strictly parallel, but globally orientated in a common general direction, as illustrated on FIG. 3. The fact that the fibers are not straight elements also enables some contact points between fibers, these contact points being the bonding points during the bonding step.

Depending on the thickness and/or weight expected for the nonwoven material, several layers of carded fibers, of a same or of different compositions, can be overlaid before bonding, using techniques and equipment well known to a person skilled in the art. Using several carding machines in parallel, usually up to three, allows to work at high speed. The resulting webs are then overlapped before bonding, or before needling in case it is implemented in the process. This also presents the advantage of being able to combine the different properties of several fiber blends.

In this inline configuration, the overall thickness of the nonwoven depends on the thickness of the web issued from each carding machine and of the number of carding machines operating in parallel. In general, no more than three parallel carding machines are used, limiting the weight of the resulting nonwoven to about 200 g/m², preferably 120 g/m², though these figures are not limiting. Moreover, the general orientation conferred to the fibers in the carding step is maintained in the bonding step, resulting in a nonwoven having a high longitudinal resistance to tear, longitudinal meaning parallel to the general orientation of the fibers, and a lower lateral resistance to tear.

This is to be distinguished from the L-process of the prior art (FIG. 1), where the crosslapping step can lead to overlapping ten or more layers of web of carding fibers, and additionally imprinting a deviation in the general orientation of the fibers, which is different between two consecutive overlap. The crosslapping therefore results in a much thicker nonwoven material than when using the inline process, typically over 120 g/m². The resulting nonwoven is also more resistance to tear in all directions.

The optional step of needling results in entangling or mixing up the fibers in the vertical dimension and is especially recommended when more than one carding machine is used. The vertical dimension here refers to a direction perpendicular to the longitudinal and lateral dimensions disclosed in the previous paragraphs, i.e. a direction crossing the various layers of webs. Needling enables to obtain a better adhesion of the web layers, by entangling the fibers. Hydroentanglement could also be used instead of or additionally to needling. Needling and hydroentangling are techniques well known from the person skilled in the art. Other reinforcing techniques can also be used like, for example, chemical bonding, either by extrusion of a polymer, knife over roll or any suitable coating technique, as known to the person skilled in the art.

Bonding of the fibers to finalize the nonwoven layer can be performed using different techniques, like mechanical or chemical bonding. In the present case, bonding preferably includes a step of thermal bonding, either alone, or in combination with another technique. Preferably, the nonwoven of the invention is a drylaid thermobonded nonwoven. A combination of mechanical, chemical and thermo-bonding is also an option.

The fibers used for the nonwoven material can be any type or any blend, in any suitable combination and are for example a blend of 100% PET fibers, wherein fiber thickness ranges between 1.7 dt to 17 dt; blend of 100% PET fibers containing bonding fiber bico PET/CoPET with thicknesses of 2, 4, 6 or 15 dn; a blend of 100% PLA fibers which are bio degradable fibers; a blend of PET structural fibers with other bico-fibers made of alternative polymers like PET/PP, PET/PE, PP/PE; a blend of PET and viscose fibers; a blend of PET and cellulose fibers or any blend as previously cited additionally containing PA fibers. As already mentioned, each carded layer can be made of a different blend of fibers, or of a same blend of fibers. Any combinations can be performed depending on the final expected characteristics of the nonwoven material layer.

The heat treatment usually applied to the carded fibers ranges between temperatures of 30° C. and 250° C., preferably between 130° C. and 140° C., depending on the nature of the fibers and the temperature needed for bonding.

Nonwoven materials resulting from the previous steps usually have a weight of below around 180 g/m$^2$, but can, in some cases have a higher weight.

Spray extrusion of polymer to form the impermeable layer can for example be performed with PET, PE, PP, PU, PTFE, TPU, PLA or PVC.

The polymer is sprayed at a temperature above its melting or glass transition temperature or a combination thereof, by hot-melt extrusion. This temperature also enables a good adhesion with the nonwoven, as the resulting polymer layer becomes also "bonded" with the fibers at the surface of the nonwoven layer. The polymer impermeable layer typically has thickness in the range of 10 to 60 μm, preferably 20 to 40 μm and still preferably around 30 μm. The same polymers can be used for high speed lamination.

Apparatus to perform this step are available on the market, like for example the laminating and/or coating systems sold by the company LACOM GmbH.

The anti-slip coating applied to the remaining surface is for example made of polyurethane, an acrylic binder, a PVA binder, EVA, rubber, polyolefine or PA. It can also be a pressure sensitive adhesive. It can also contain fillers, resins, antistatic additives, crosslinkers, or any other suitable additive. The spraying can be performed by hotmelt techniques or by spraying the polymers dissolved in water or another solvent. Chemical bonding is also a suitable technique to apply the anti-slip coating, using for example polymer extrusion, knife over roll or any suitable coating system, as known to a person skilled in the art.

The steps of anti-slip coating can also be performed before the polymer extrusion of the impermeable layer. The order of these steps is not an essential feature of the process of the invention.

The manufacture of a three layered product has been described above. However, it is possible that the sheet material has more than three layers, additional layers being applied on top of the impermeable surface. The nonwoven sheet material of the invention can comprise, on top of the impermeable layer, one or more additional nonwoven sheet material and/or one or more additional polymer layer.

In particular, one or more additional nonwoven sheet materials, wherein the fibers have a common general orientation, can be applied onto the impermeable layer. The one or more additional nonwoven sheet materials can have the same composition as the first nonwoven sheet material, or a different composition, in order to bring additional properties to the final product.

One or more additional polymer layers can also be applied, either directly onto the impermeable layer or onto an additional nonwoven material. The one or more additional polymer layers can be of any kind, for example any polymer material described above, permeable or impermeable. Several additional polymer layers, having the same or different characteristics, can also be applied on top of each other.

It should be understood that the invention relates to a nonwoven sheet material having an impermeable layer on one side and an anti-slip coating on the other side, wherein the fibers of the nonwoven sheet material have a common general orientation and wherein additional nonwoven and/or polymer layers can optionally be applied onto the impermeable layer. The additional nonwoven and/or polymer layers can be alternated to confer specific characteristics to the product.

Figure 4:
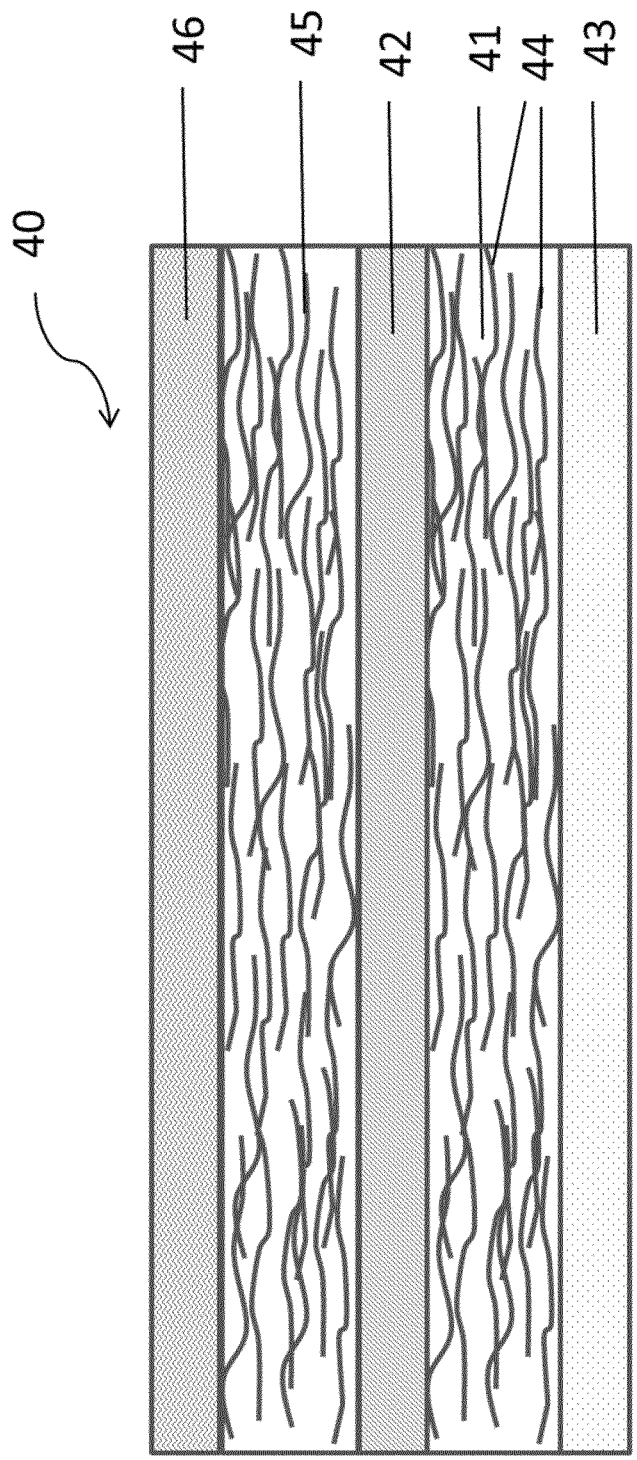
FIG. 4 illustrates a section of a product of the invention comprising additional layers.

For example, as illustrated in FIG. 4, a nonwoven material layer 41, made from multiple fibers 44, is covered on one side by an impermeable layer 42 and on its other side by an anti-slip coating 43. A second nonwoven layer 45 is applied onto the impermeable layer 42. A second polymer layer 46 is applied onto the second nonwoven layer 45.

The second nonwoven layer is here represented with fibers having a general common orientation. The fibers of both nonwoven layers can be of the same nature, or of different nature, depending on the applications.

The second polymer layer 46 can be here, for example a permeable layer, which would let liquid from a spillage go through. The nonwoven layer 45 underneath could for example favor absorption and dispersion of the liquid, leaving a dry appearance at the surface of the product.

A second polymer layer could for example also have anti-slip properties and/or could have a particular color which would help the user to properly place the sheet material.

Any combination of additional nonwoven and/or additional polymer layer can be envisaged, suitable for a particular intended use of the product.

The invention claimed is:

1. A process for manufacturing a nonwoven sheet material having an liquid-impermeable polymer layer on one side and an anti-slip coating on the other side, process comprising:
    carding fibers and forming a web, wherein the fibers have a common general orientation;

bonding the fibers into a nonwoven sheet material;

applying an anti-slip coating onto a first surface of the nonwoven sheet material;

applying a polymer onto a second surface of the nonwoven sheet material to form the liquid impermeable polymer layer; and maintaining the common general orientation of the fibers over the whole process, wherein applying the polymer onto the second surface is performed at high speed by high speed lamination or by spraying an extruded/melted polymer on the nonwoven sheet material, wherein the high speed is greater than 25 m/min.

2. The process according to claim 1, wherein bonding the fibers comprises overlapping and bonding together at least two webs of carded fibers.

3. The process according to claim 1, wherein the anti-slip coating is applied by hot-melt coating.

4. The process according to claim 1, wherein the impermeable coating is applied by hot-melt extrusion.

5. The process according to claim 1, further comprising applying onto the impermeable layer one or more additional nonwoven sheet materials.

6. The process according to claim 5, further comprising applying, onto an additional sheet material, one or more polymer layers.

7. The process according to claim 1, further comprising applying onto the impermeable layer one or more polymer layer.

8. The process according to claim 2, wherein the anti-slip coating is applied by hot-melt coating.

9. The process according to claim 8, wherein applying a polymer onto the second surface is performed at high speed.

10. The process according to claim 9, wherein the polymer is applied by high speed lamination or by spraying an extruded/melted polymer on the nonwoven sheet material.

11. The process according to claim 2, wherein applying a polymer onto the second surface is performed at high speed.

12. The process according to claim 11, wherein the polymer is applied by high speed lamination or by spraying an extruded/melted polymer on the nonwoven sheet material.

* * * * *